3,305,465
PHOTOCHEMICAL PROCESS FOR THE PRODUCTION OF CYCLOBUTADIINDENE

Günther Otto Schenck, Wolfgang Metzner, and Carl Heinrich Krauch, Mulheim (Ruhr), Germany, assignors to Studiengesellschaft Kohle m.b.H., Mulheim (Ruhr), Germany
No Drawing. Filed Mar. 26, 1963, Ser. No. 267,960
Claims priority, application Germany, Mar. 28, 1962, St 19,021
9 Claims. (Cl. 204—162)

This invention relates to the preparation of a new class of compounds, the base body of which is cyclobutadiindene.

It has been found that indene under the conditions of the sensitized photosynthesis undergoes dimerization wherein one of the double bonds of each indene molecule reacts with each other in a manner such that a dimer containing the cyclobutane ring is formed.

Accordingly, it is an object of this invention to provide a process for the preparation of cyclobutadiindene, this process comprising subjecting indene in the liquid phase to the conditions of the photosynthesis in the presence of photosensitizers. The resultant dimer is not only useful as a valuable starting material for the production of, for example, dyes but is also of particular importance as an intermediate in the production of extremely pure indene. It has been found that cyclobutadiindene can be decomposed by simple thermal cracking to form again monomeric indene. Thus, the invention comprises a process for the preparation of extremely pure indene, which comprises subjecting an indene-containing starting material to the photosensitized cyclodimerization in accordance with the invention, subsequently recovering from the reaction product the di-indene in pure state, e.g. by crystallization or distillation of the unreacted components and subsequently recovering therefrom extremely pure indene by thermal decomposition.

It has been found very surprisingly that the otherwise usual polymerization of indene under the action of light does not take place under the conditions of the photosynthesis of the invention.

The cyclization reaction of the invention is carried out in the liquid phase. It is most conveniently effected with solutions of the sensitizers in liquid indene. However, additional solvents may be used. Suitable are polar and non-polar solvents, appropriate organic solvents being preferred. Particularly preferred solvents include hydrocarbon compounds of aliphatic or aromatic nature conventionally used for this purpose.

Preferred photosensitizers for the purposes of the invention include compounds containing carbonyl groups. Both aldehydes and especially ketones are suitable, it being possible that several carbonyl groupings are present in the sensitizers, e.g. as polyketones. Examples of sensitizers which are suitable for the purposes of the invention include acetone, benzophenone, benzaldehyde, Michler's ketone, diacetyl or benzil. Corresponding thiocarbonyl compounds are also suited as sensitizers, e.g., Michler's thioketone. Other sensitizers, e.g. dinaphthylene, may also be used in the process of the invention. The selection of the sensitizer to be preferably used in every particular case is effected in a manner known per se by adapting the emission spectrum of the particular light source used to the absorption spectrum of the sensitizer. In other respects, the photochemical reaction is carried out in a manner known per se. Thus, the reaction is effected under the action of radiating systems which are capable of emitting light which is absorbable by the sensitizers, preferably within the range of wave lengths of from 250 to 600 millimicrons. The reaction may be carried out within a wide range of temperatures, preferred being temperatures between $-50°$ C. and $+80°$ C.

The decomposition described of the cyclodimerization product to form extremely pure indene is most conveniently effected by distillation of the dimerization product under atmospheric pressure.

Besides indene, its homologues, e.g. its alkyl-substituted products, may also be subjected to the process of the invention.

*Example 1.—Exposure of sensitizer solutions in indene*

200 ml. of indene in which the particular sensitizer was dissolved were flushed for 10 minutes with inert gas. Then exposure was made in an apparatus provided with a water-cooled lamp well of glass using a 125-watt high pressure mercury arc lamp (Philips HPK).

Processing may be effected by two methods:

(1) The reaction is driven until the diindene crystallizes. The diindene is removed by filtration and the mother liquor is exposed again.

(2) Unconsumed indene is distilled off under vacuum and the diindene is left as the residue. The sensitizer may be recovered by recrystallization or by chromatography.

| No. | Sensitizer | Amount (g.) | Exposure period (hrs.) | Quantity of cyclobutadiindene | |
|---|---|---|---|---|---|
| | | | | Raw product m.p. 104–108° C. (g.) | Extremely pure product m.p. 112° C. after chromatography, recrystallized from acetone (g.) |
| 1 | Michler's ketone | 2 | 24 | 64.3 | 50.4 |
| 2 | Michler's thioketone | 0.05 | 25 | 4.7 | |
| 3 | Benzaldehyde | 2 | 22.5 | 27 | 3.67 |
| 4 | Diacetyl | 2 | 24 | 6.9 | |
| 5 | Benzil | 2 | 14.5 | 20 | 13.5 |
| 6 | Dinaphthylene thiophene | 0.05 | 20 | 1.4 | 1.3 |

Cyclobutadiindene: M.P. 112–113° C., B.P. 134–135° C./0.25 mm. Hg. Molecular weight (cryoscopically with benzene) 227

$C_{18}H_{16}$ (232.30) Calculated: C, 93.06%; H, 6.94%. Found: C, 92.99%; H, 6.82%.

*Example 2.—Exposure of indene in solution*

(a) A solution of 20.3 g. of indene and 3 g. of benzophenone in 150 ml. of benzene gives 20.3 g. of diindene when exposed for 20 hours as described in Example 1. When exposing for 45 hours without the use of a sensitizer, no diindene is obtained.

(b) When exposing a mixture of 75 ml. of indene and 75 ml. of acetone for 27 hours in a quartz apparatus in the manner described in Example 1, 14 g. of pure diindene (39 g. of raw product) are obtained.

*Example 3.—Cleavage of the diindene to form again indene*

25 g. of diindene are distilled in an oil bath (260° C.). After 1 hour, 15 g. of indene having a refractive index, $n_D^{20}$, of 1.5797 (literature value: $n_D^{18}$, 1.5773; the indene charged to the cyclodimerization had a refractive index, $n_D^{20}$, of 1.5740) had been recovered.

What is claimed is:

1. A process for the preparation of cyclobutadiindene, which comprises subjecting indene in the liquid phase to the action of light in the presence of photosensitizers, said light being capable of being absorbed by said sensitizers.

2. A process according to claim 1, in which said photosensitizer is a member selected from the group consisting of aldehydes, ketones, thiocarbonyl compounds and dinaphthylene compounds.

3. Process according to claim 2, in which said photosensitizer is a member selected from the group consisting of acetone, benzophenone, benzaldehyde, Michler's ketone, diacetyl and benzil.

4. Process according to claim 1, in which said indene is admixed with an organic solvent.

5. Process according to claim 1, in which said indene is subjected to the action of light at temperatures in the range of from —50° C. to +80° C.

6. Process according to claim 1, in which said light is of the wave length between 250 and 600 millimicrons.

7. Process according to claim 1, which includes recovering the cyclobutadiindene formed, thermally cleaving said cyclobutadiindene and recovering the pure indene thus produced.

8. Process according to claim 7, in which said cyclobutadiindene is distilled at atmospheric pressure.

9. A process for purifying indene which comprises irradiating indene in the liquid phase with light in the presence of a photosensitizer capable of absorbing said light, thermally cleaving the cyclobutadiindene thus produced, and recovering the pure indene formed.

No references cited.

JOHN H. MACK, *Primary Examiner.*

H. S. WILLIAMS, *Assistant Examiner.*